June 26, 1956 G. C. SZIKLAI 2,752,416

COLOR TELEVISION SYSTEMS

Filed July 9, 1954 2 Sheets-Sheet 1

INVENTOR.
George C. Sziklai
BY
[signature]
ATTORNEY

COLOR TELEVISION SYSTEMS

Filed July 9, 1954

INVENTOR.
George C. Sziklai
BY
[signature]
ATTORNEY

United States Patent Office 2,752,416

Patented June 26, 1956

2,752,416

COLOR TELEVISION SYSTEMS

George C. Sziklai, Princeton, N. J., assignor to Radio Corporation of America, a corporation of Delaware Application July 9, 1954, Serial No. 442,321

13 Claims. (Cl. 178—5.4)

This invention relates to color television systems and more particularly to apparatus for providing reproduction of color images in systems of the type wherein the color subcarrier is phase and amplitude modulated in accordance with color information.

In accordance with the Color Television Standards approved by the Federal Communications Commission on December 17, 1953, there is provided a composite color television signal which contains both the luminance information or monochrome information relating to the scene and also a color modulated subcarrier whose phase is indicative of hue and whose amplitude is inductive of color saturation.

It has heretofore been proposed to reproduce by utilizing the phase modulation component of the color subcarrier to direct or deflect a kinescope beam to the proper color producing area of the kinescope screen. The amplitude component of the phase modulated subcarrier is additionally utilized for changes of the beam size or focus so that the desired number of different component color reproducing elements are bombarded by the electron beam. In this manner the proper combination of colors is selected to provide the desired hue and saturation and the brightness component is provided by intensity modulating the electron beam to produce directly in the kinescope a color picture from the incoming video information.

In such a system a multiple element target screen is provided, each of the multiple elements taking the form of various selective color component light producing strips. The arrangement may be such that a plurality of horizontal strip-like selected component color light producing strips are provided along which an appropriately designated scanning beam is deflected to produce a colored light image. Each of the phosphor strips has an elemental width such that a group of strips has a combined width which is no greater than one of the dimensions of an elemental image area. Each group of phosphor strips includes at least one of each of a plurality of component colors of an image to be reproduced.

In the use of color phosphor screens in cathode ray tubes with adjacently positioned horizontally orientated ruled color lines having different selective component light producing elements, for example, red, green, and blue, it has been a problem to accurately direct the beam to the desired color line combination. This is generally true because of the inherent limitations of circuits for deflecting the electron beam.

The present invention in its more general form contemplates apparatus for accurately deflecting the electron beam to the desired color line combination, by utilizing a feedback loop or servo system. This servo system includes the sampling of the colors reproduced on the screen of the color tube and comparing the samples with the color subcarrier of the incoming television signal. The sampling of the colors reproduced on the screen of the color tube is accomplished by sensing the presence of all of the light color components within a single photoelectric cell, however, the individual light color components of the total signal formed in the photoelectric cell are each modulated by a different modulating signal frequency. Frequency discriminating means are then provided to separate the individual light color component signals of the total signal formed in the photoelectric cell, thereby producing the desired sampling signals.

An object of this invention is to provide color television systems and methods providing improved color reproduction and registration with a single beam controlled color reproduction device having ruled color light producing elements.

A further object of this invention is to provide an improved system for individually sampling light intensities of light of various wave lengths.

Other and incidental objects of this invention will be apparent to those skilled in the art from reading the following specification and on inspection of the accompanying drawings in which.

Figure 1:
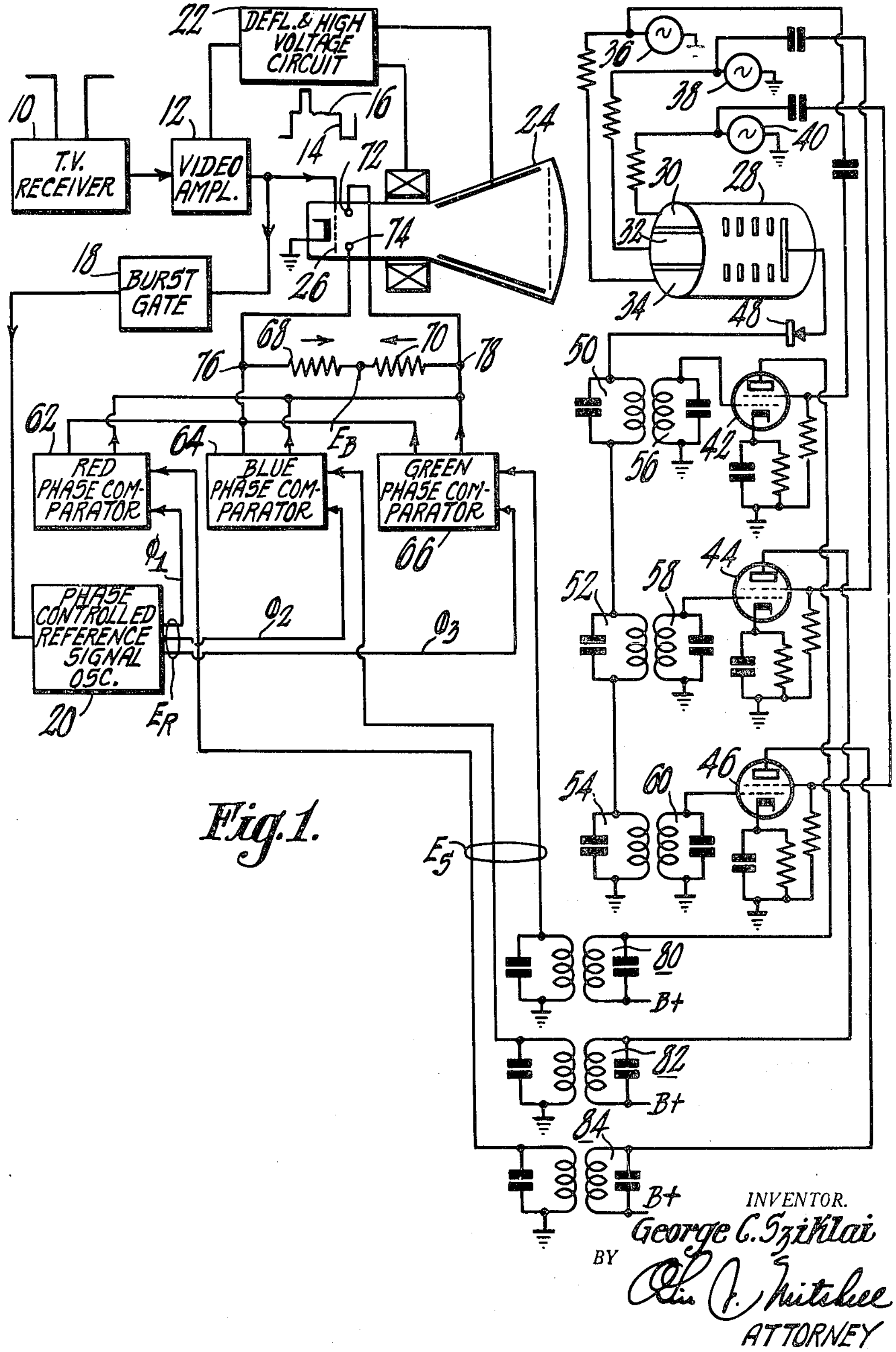
Figure 1 is a block and circuit diagrammatic representation of a color television system embodying the invention.

In Figure 1 a suitable television receiver 10 is provided for detecting a video signal for use in video amplifier 12. The detected video signals include a color subcarrier component whose relative phase indicates color hue and whose relative intensity indicates color saturation of the transmitted image. In the color television signal represented by wave form 14, there is a burst of subcarrier reference frequency 16 on the backporch of the sync pedestal. The burst 16 may be separated from the video by a burst gate circuit 18 to phase control a reference signal oscillator 20, thereby maintaining the reference signal oscillator 20 in an accurate phase relationship with the subcarrier generator at the transmitter.

The usual deflection and high voltage circuits 22 are provided for causing the electron beam generated in a kinescope 24 to scan the ruled color lines which form the screen of the kinescope 24. The amplitude of the video wave represents the brightness component of the picture and is used to intensity modulate the cathode ray beam in the kinescope 24 by means of a control element 26. There is contained in the video brightness signal a color subcarrier component whose phase and amplitude represents the color hue, and the color saturation information respectively. Accordingly on the screen of the kinescope 24, there will be developed a modulation component at the subcarrier frequency which may, for example, be a frequency near the further end of the video response characteristic of the system, say 3.58 megacycles. The subcarrier is chosen to have a frequency so related to the scanning frequency that a minimum of interference occurs between the color information and the brightness information.

A single photoelectric device 28 serves to sample the light intensity of the various color components appearing at the screen of the kinescope 24. The photoelectric device 28 will be described in greater detail below, however, three separate photocathodes 30, 32, and 34 are provided each being sensitive to a particular color of light or to light of a particular wave length. Each of the photocathodes are isolated by insulating material from the others and are connected to separate sources of modulating signals 36, 38, and 40. The modulating signals from sources 36, 38, and 40 are also connected to grids in vacuum tubes 42, 44 and 46 respectively, wherein the modulating signals may be mixed with signals from the photoelectric cell 28. The output from the photoelectric cell 28 is connected through a unilateral conducting device 48 to a series of frequency discriminating circuits 50, 52, and 54. The frequency discriminating circuits 50, 52 and 54 in conjunction with tank circuits 56, 58 and 60 to which they are inductively coupled eliminate undesirable frequency components from the signal from the photoelectric cell 28 and preserves a signal which is connected to the vacuum tube mixers 42, 44, and 46 respectively. The output signals from the vacuum tubes 42, 44, and 46 comprise signal voltages which are correspondingly inserted at one input terminal of the respective red, blue, and green phase comparator circuits 62, 64, and 66.

The subcarrier phase may be detected by comparing it with the reference signal $E_r$, which is derived from the color subcarrier oscillator 20 in the respective phase $\phi_1$, $\phi_2$, $\phi_3$, in a manner similar to that practiced in current color subcarrier systems. By choosing the proper polarity and phase, output potentials will be obtained from the phase comparator circuits 62, 64, and 66 with sense and amplitude such as to provide deflection and focus potential to the kinescope 24 by resistors 68 and 70 to control the electron beam therein by means of auxiliary deflecting and focussing electrodes 72 and 74. These electrodes may be constructed by those skilled in the art to have such configuration and location to deflect the beam and focus in accordance with potentials developed at the respective common output terminals 76, and 78 of the several phase comparator circuits 62, 64, and 66. A teaching of the principles thus involved may be found, for example, in publications such as the text book, Fernsehen, by Dr. F. Schröter, published in Berlin, by Julius Springer in 1937 which contains a chapter on electron optic geometry containing the principles involved in the construction of focussing and deflecting lens configurations.

Consider now that a color signal is reproduced on only the blue color lines of the kinescope. The subcarrier signal component will be picked up by the photoelectric cell 28 and inserted at the blue phase comparator circuit 64 along with the reference potential of phase $\phi_2$. To consider in detail the method by which the photoelectric cell 28 and its associated circuitry separate the subcarrier signal component, assume that the blue light is being modulated by the assumed subcarrier frequency 3.58 megacycles. The blue light having a particular wave length will cause electron emissions from one of the photocathodes 32 of the photoelectric device 28, however, these emissions will be modulated by a signal from the alternating signal source 38. The output signal from the photoelectric cell 28 will thus contain a frequency component of the subcarrier signal plus the signal from the signal source 38. Frequency selective circuit 52 is so constructed as to respond only to a frequency equalling the total of the frequency of the signal from source 38 and the frequency of the signal of the subcarrier. Assuming the signal from source 38 to be $F_1$ the output from the frequency selective circuit 52, will be a signal of a frequency of the subcarrier signal or 3.58 megacycles plus $F_1$. This 3.58 megacycle plus $F_1$ signal is applied to one of the grids of vacuum tube 44. The signal $F_1$ from the alternating signal source 38 is also applied to another grid of the vacuum tube 44. Vacuum tube 44 therefore mixes the two signals $(3.58+F_1)$ and $F_1$ and the output signal from the mixer tube 44 will contain a frequency component $(3.58-F_1)+F_1$ which is simply the 3.58 megacycle signal. The electrons emitted from the red and green sensitive photocathodes 30 and 34 of the photoelectric cell 28 are modulated by different signal frequencies from the signal frequency of alternating sources 36 and 40. In this manner each of the color representing component signals having a frequency of the subcarrier frequency may be separately derived at the output of the mixer tubes 42, 44, and 46. Frequency discriminating circuits 80, 82, and 84 are placed in the output circuits of the tubes such that they deliver the component light signals to the phase comparator circuits 62, 64 and 66.

Assuming for the moment that the subcarrier signal is occupied a zero relative phase angle indicated the proper color hue reproduction for blue. The reference signal $\phi_2$ will be chosen at a 90° phase angle in order to provide between the phase comparator output terminals 76 and 78 a balanced or zero potential output condition. Thus if the color subcarrier phase indicates blue is the desired color and blue is the only color obtained from the photocell sampling circuit, there will be no deflection of the beam. The same operation holds true for the red and green subcarrier components in effecting deflection. The respective phase angles assumed to identify the color components may be changed with corresponding change of the reference signal phase used for comparison. For purposes of ready comparison, a table is provided for red, green, and blue hue color signals and two sets of corresponding reference signal phase conditions as follows:

| | B | G | R |
|---|---|---|---|
| | *Degrees* | *Degrees* | *Degrees* |
| Zero output at | 0 | 120 | 240 |
| Reference signal phase | 90 | 210 | 330 |
| Zero output at | 0 | 197 | 90 |
| Reference signal phase | 90 | 287 | 180 |

In the event the color information signal does not fall upon the proper ruled lines, the balanced condition will not exist (except when no signal is present) and a properly sensed deflection potential will be developed between the terminals 76 and 78 by current or electron flow coming from the output terminals of one or all of the phase converter circuits 62, 64, and 66 in the direction indicated by the arrows above the output resistors 68 and 70 connected between the terminals 76 and 78.

To consider in detail, this phase of the operation, assume that the subcarrier falling on the blue lines has a relative phase of 120 indicating that the color view green should be reproduced. The phase comparators 62 and 66 for red and green signals will have no input potential and therefore will provide no output deflection potential. The blue phase comparator 64, however, will develop a potential corresponding to the phase difference between the signal developed and the reference signal at phase $\phi_2$. Accordingly, deflection potentials are developed in the output resistors 68 and 70 connected between terminals 76 and 78 to provide a potential difference between the deflection electrodes 72 and 74 in the kinescope 24. The potential applied to the electrodes of the kinescope 24 will be of sufficient magnitude to deflect the beam from the blue line to the green line. At this time a balanced or null condition is reached in both the blue and green phase comparators 64 and 66, thereby providing no deflection potential and maintaining the beam in registration on the green line. Like action is provided whether one or a plurality of signals is present since the output signals of each phase comparator circuit is used to deflect the beam. It is noted that in a standard television system, the deflection angle provided by the auxiliary electrodes 72 and 74 will maintain the deflection angle small, being in the order of 1/525 of the total vertical deflection angle, and therefore reliable color registration is readily obtained.

The foregoing analysis was made with the assumption that the beam would be focussed on a single line. Assume now that the beam impinges on a spot which should represent only a blue subcarrier component but which is so large that it overlaps onto both the red and green lines. As hereinbefore mentioned, the color subcarrier amplitude denotes color saturation. Since only blue information is present the saturation is maximum and the subcarrier would have maximum amplitude. The phase comparator circuits are therefore so chosen that they are responsive to amplitude in the following manner. When a signal voltage is obtained, balanced current components flow in both resistors 68 and 70 so that no differential potential is established between the deflecting electrodes 72 and 74, but the average potential as compared with surrounding electrodes is changed thereby effecting the focus of the beam.

Figure 2:
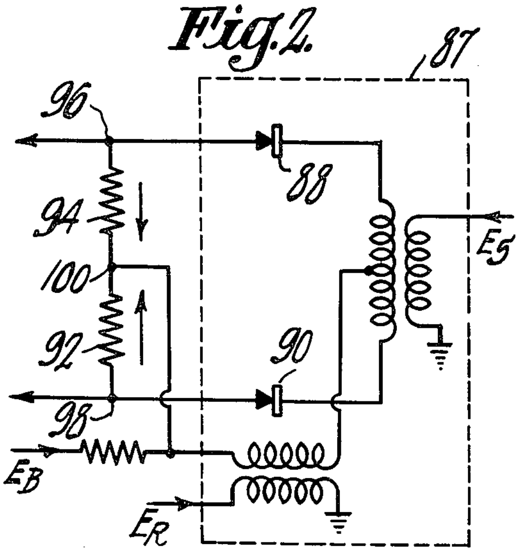
Figure 2 is a schematic circuit diagram of one form of a phase comparator circuit which may be utilized in connection with the present invention.

Figure 2 illustrates schematically a phase comparator circuit 87 which operates in this manner. As the signal potential $E_s$ is applied, both diodes 88 and 90 conduct upon opposite alternations of the signal potential to cause a balanced current flow in the resistors 92 and 94. The greater the signal amplitude, the greater the potential developed at the terminals 96 and 98 as compared with the modtap terminal 100 or the input terminal $E_b$ at which a biasing or auxiliary focussing potential may be added. It is therefore apparent that any subcarrier signal component $E_s$ present on the kinescope screen will cause the beam to be focussed to a smaller vertical area depending upon the amplitude of the subcarrier.

When the subcarrier amplitude is not at a maximum the color saturation is less and a white signal might be mixed with the color signal to obtain the present reproduction. Thus, the beam will be slightly defocussed (in the vertical direction) supplying a white component made up of a portion of red, blue, and green light so that automatic saturation control is obtained by changing the beam focus. When the subcarrier amplitude is zero, the beam covers all the red, green, and blue lines so that a monochrome signal is reproduced.

Figure 3:
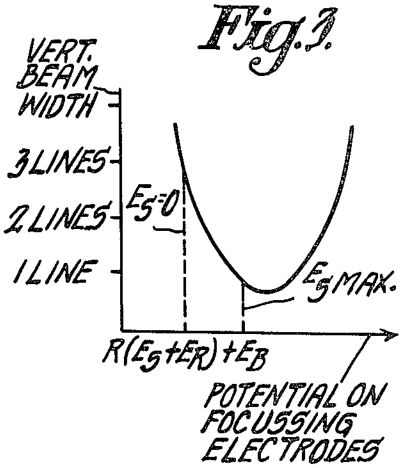
Figure 3 is a graphical representation of potentials derived from the signals which are useful in obtaining beam focussing.

Such a relationship of potential on the focussing electrodes as compared with vertical beam width is shown in Figure 3 where the potential is the summation of the rectified signal and reference potentials with the biasing potential as expressed by the term $R(E_s+E_r)+E_b$. The parabolic curve is shown to indicate that phase relationship between the signal and reference potentials may be either leading or lagging to effect the desired automatic focus operation.

Figure 4:
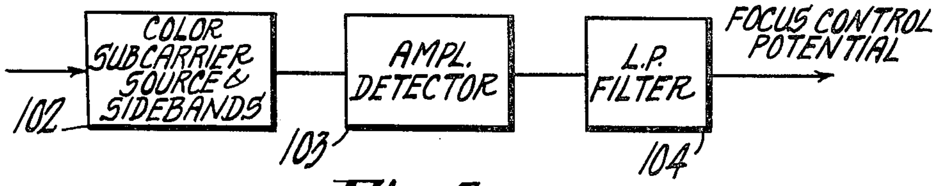
Figure 4 is a block diagram of a circuit embodiment for obtaining focussing control potentials in accordance with the invention.

If the phase comparator is desired which is non-responsive to subcarrier amplitude variations in the manner described, or should a separate deflecting and focussing system be desired, the circuit of Figure 4 may be used in accordance with the invention to obtain focus control potential. Thus, the block 102 indicates any suitable source of color subcarrier along with the side bands which may be found, for example, in the video circuits of a television receiver. The color subcarrier is then amplitude detected at the block circuit 103 and filtered at the block circuit 104 to provide the desired focus control potential at the output lead $E_b$. This potential, as that above described, is of an amplitude variable with the color saturation information, and may be connected at terminal 100 of Figure 2 to supplement or provide focus control, as desired.

Figure 5:
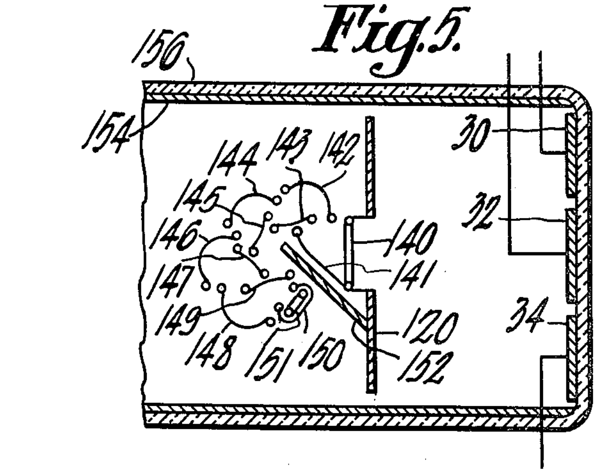
Figure 5 is a schematic representation of a photoelectric cell to be utilized in this invention.

Figure 5 is a detailed drawing of the photoelectric cell 28 of Figure 1. The photoelectric cell 28 is provided with three photo emissive cathodes 30, 32, and 34. Each of the photocathodes contains a filter such that it is sensitive to emit electrons when it receives light of a particular wave length or light within a particular range of wave lengths. Electrons emitted from the photocathodes 30, 32, and 34 are accelerated by accelerating electrode 120 through a grill 140 onto a first dynode 141. Electrons from the first dynode then form an amplified signal by passing through the following dynodes 142, 143, 144, 145, 146, 147, 148, 149, and 150 to finally land upon the anode 151. The electrons impinging on any of the dynode surfaces produce many other electrons, the number depending upon the impinging electrons. The electrostatic fields formed by the dynodes direct the electrons so emitted to the next dynode where new electrons are knocked out. This multiplying process is repeated in each successive stage, with an ever increasing stream of electrons until those emitted from the last dynode number 150 are collected by the anode 151 and constitute the current fed to the output circuit. Dynode 150 is so shaped as to partially enclose the anode 151 and to serve as a shield for the anode 151, in order to prevent the fluctuating potential of the anode 151 from interfering with electron focussing in the interdynode region. Actually the anode 151 consists of a grid which allows the electrons from the dynode 149 to pass through it to the dynode 150. Spacing between the dynode 150 and the anode 151 creates a collecting field such that all the electrons emitted by the dynode 150 are collected by the anode 151. It may therefore be seen that the output current is substantially independent of the instantaneous positive potential on anode 151.

The shield 152 which extends between the dynode 141 and the anode 151 shields the dynode 141 and the photocathodes 30, 32, and 34 from the anode 151 and prevents ion feedback. If positive ions produced by the high-current region near the anode 151 were allowed to reach the photocathodes or the dynode 141, such ions would cause the emission of spurious electrons which after multiplication would produce undesirable regeneration. A metallic coating 154 is placed on the inner side wall of the evacuated glass bulb 156 and is connected to the photocathodes 30, 32, and 34. The metallic coating 154 serves not only to prevent extraneous light from reaching the dynode 141 but also to direct the electrons from the cathodes 30, 32, and 34 toward the dynode 141. The grill 140 through which the electrons reach the dynode 141 is connected to the dynode 141 and serves along with the accelerating electrode 120 as an electrostatic shield for the open side of the electrode structure. Successive stages in the dynode section of the photocell are operated at voltages increasing from the first dynode to the anode.

Having thus described the invention, what is claimed is:

1. In a color television signal processing system including discrete color light producing elements and means for selectively energizing said elements, a system for detecting the presence and intensity of light waves from said elements comprising: a photoelectric device, said photoelectric device comprising a plurality of photocathodes and an anode, each of said photocathodes being sensitive to emit electrons when illuminated by light within a particular range of wave lengths, means for modulating the emissions of each of said plurality of photocathodes, means for forming an electrical signal which varies as the total emission from all of said photocathodes, frequency separating means connected to receive said electrical signal, said frequency separating means for separating said electrical signal into a plurality of modulated signals, and demodulating means for demodulating each of said modulated signals to form light intensity signals, each of said light intensity signals being representative of the intensity of light within a particular range of wave lengths present on said plurality of photocathodes and adapted to effect registration of said energizing means.

2. Apparatus according to claim 1 wherein said means for modulating the emissions of said plurality of photocathodes includes means for applying an alternating signal between each of said photocathodes and said anode.

3. Apparatus according to claim 1 wherein said means for modulating the emissions of said plurality of photocathodes includes means for applying a modulating signal of one frequency between one of said photocathodes and said anode and means for applying a modulating signal of a different frequency between another one of said photocathodes and said anode.

4. Apparatus according to claim 1 wherein said frequency separating means comprises a series of frequency discriminating circuits, each responsive to a signal of a particular frequency.

5. Apparatus according to claim 2 wherein said demodulating means includes means for combining said modulated signals with said signals applied to said photocathodes, and frequency discriminating means connected to said signal combining means.

6. In a color television signal processing system including means for generating a plurality of individual colors, a system for detecting the intensity of light within each of a plurality of wave length ranges comprising: a photoelectric cell comprising a plurality of photocathodes, and an anode, each of said photocathodes being sensitive to a particular range of light wave lengths, said photocathodes being adapted to receive light, modulating means for modulating the emissions from each of said photocathodes by a different modulating signal, means for developing an output signal responsive to the current variations in said photocell, separating means for separating said output signal into a plurality of modulated signals, and demodulating means for demodulating each of said modulated signals to form light intensity signals, each of said light intensity signals being indicative of the intensity of light within a particular range of wave lengths present on said plurality of photocathodes and adapted to effect the generation of said individual colors.

7. In a television system for reproducing color pictures with a lined-screen single gun cathode-ray tube in response to a video signal having a subcarrier component whose phase represents color hue, a system for detecting the presence and the intensity of light waves representative of individual colors reproduced on the lines of said tube comprising: a photocell for converting light signals into electrical signals, said photocell comprising a plurality of photocathodes and an anode, each of said photocathodes being sensitive to respond to light waves of a particular wave length, means to apply a modulating signal of a particular frequency between each of said cathodes and said anode to modulate the emission from each of said photocathodes, means for developing an output signal which varies as the electrical current in said photocell, frequency discriminating means for separating said output signal into a plurality of separate signals, and means for demodulating each of said separate signals to form a plurality of light intensity signals, each of said light intensity signals being indicative of the intensity of light of a particular wave length present on said plurality of photocathodes and adapted to automatically effect registration for providing light waves in accordance with the phase of said subcarrier component.

8. In a color television signal processing system including discrete color light producing elements and means for selectively energizing said elements, a system for detecting the presence and intensity of light waves from said elements comprising: a photoelectric cell comprising a plurality of photocathodes and an anode, each of said photocathodes being sensitive to a particular range of light wave lengths, means for applying a different modulating signal between each of said photocathodes and said anode to modulate the emissions from each of said photocathodes, means connected to said anode of said photocell for generating an electrical signal, said electrical signal being such as to vary as the current in said photoelectrical cell, a plurality of serially connected frequency discriminating circuits connected to receive said electrical signal, each of said frequency discriminating circuits being operative to isolate signals formed by emissions from a particular one of said photocathodes to form a plurality of isolated, modulated signals, and demodulating means for demodulating each of said isolated modulated signals to form light intensity signals, each of said light intensity signals being indicative of the intensity of the light within a particular range of wave lengths present on said plurality of photocathodes and adapted to effect registration of said energizing means.

9. Apparatus according to claim 7 wherein each of said photocathodes comprises a cathode of photo-sensitive material covered with a light filter, said light filter being responsive to pass light only within a predetermined range of wave lengths.

10. In a color television signal processing system including discrete color light producing elements and means for selectively energizing said elements, a system for detecting the presence and intensity of light waves from said elements comprising: a photoelectrical cell, comprising a plurality of photocathodes, a multiplicity of dynode electrodes and an anode, each of said photocathodes being sensitive to a particular range of light wave lengths, a source of a plurality of alternating signals, each of said alternating signals being of a different frequency, means for applying each of said alternating signals between each of said photocathodes and said anode, means for developing an output signal which varies as the current at said anode, a plurality of serially connected frequency discriminating circuits connected to receive said output signal, each of said frequency discriminating circuits being operative to isolate the signals formed by emissions from a particular one of said photocathodes to form a plurality of isolated modulated signals, and demodulating means for demodulating each of said isolated modulated signals to form light intensity signals, each of said light intensity signals being indicative of the intensity of the light within a particular range of wave lengths present on said plurality of photocathodes and adapted to effect registration of said energizing means.

11. In a color television signal processing system including discrete color light producing elements and means for selectively energizing said elements, a system for detecting the presence and intensity of light waves from said elements comprising: a photoelectrical cell, comprising a plurality of photocathodes, a multiplicity of dynode electrodes and one anode, each of said photocathodes being sensitive to a particular range of light wave lengths, a like plurality of alternating current signal generators, each of said signal generators for generating a signal of a frequency different from said other signal generators, each of said plurality of alternating current signal generators each being connected between one of said cathodes and said anodes, means for developing an output signal which varies as the current at said anode, a plurality of serially connected frequency discriminating circuits connected to receive said output signal, each of said frequency discriminating circuits being operative to isolate the signals formed by emissions from a particular one of said photocathodes to form a plurality of isolated modulated signals, and demodulating means for demodulating each of said isolated modulated signals to form light intensity signals, each of said light intensity signals being indicative of the intensity of the light within a particular range of wave lengths present on said plurality of photocathodes and adapted to effect registration of said energizing means.

12. Apparatus according to claim 10 wherein said demodulating means comprises an electron discharge device having a first grid connected to receive a signal from one of said alternating current signal generators, and a second grid connected to receive one of said isolated modulated signals, means for energizing said electron discharge device and an output circuit connected to said electron discharge device, said output circuit comprising a frequency selective circuit.

13. A color television system comprising in combination, a plurality of adjacently positioned strip-like and horizontally orientated different selected component color light producing elements, means providing a single electron scanning beam, means causing said beam to successively traverse said elements, beam intensity control means for said beam, means controlling said beam intensity with a video signal including a color subcarrier component whose phase indicates color hue, deflecting means for registering said beam upon desired colors, phase comparator means having two input circuits and one output circuit, means sampling color signals of separate colors produced by said elements coupled to one of said input circuits, said sampling means comprising a photoelectric cell comprising a plurality of photocathodes and an anode, each of said photocathodes being sensitive to a particular range of light wave lengths, said photocathodes adapted to receive light, modulating means for modulating the emissions for each of said photocathodes by a different modulating signal, means for developing an output signal responsive to the current variations in said photoelectric cell, separating means for separating said output signal into a plurality of modulated signals, demodulating means for demodulating each of said demodulated signals to form light intensity signals, each of said light intensity signals being indicative of the light within a particular range of wave lengths projected on said photocathode, a color subcarrier reference signal connected to the other of said input circuits, and a circuit connecting said output circuit to said deflecting means whereby color signals are automatically registered for providing the hue indicated by the color subcarrier phase.

References Cited in the file of this patent

UNITED STATES PATENTS 2,657,257 Lesti ------------------ Oct. 27, 1953